(12) United States Patent
Sabourdy et al.

(10) Patent No.: US 9,166,359 B2
(45) Date of Patent: Oct. 20, 2015

(54) METHOD AND LASER OSCILLATOR FOR THE GENERATION OF A LASER BEAM

(75) Inventors: David Sabourdy, Orleans (FR);
Jean-Eucher Montagne, Orleans (FR);
Alain Barthelemy, Limoges (FR);
Agnès Desfarges-Berthellemot, Couzeix (FR); Vincent Kermene, Aixe/Vienne (FR); Julien Guillot, Ladignac le Long (FR); Brigitte Serreault, Sceaux (FR); Bruno Esmiller, Villennes sur Seine (FR)

(73) Assignee: COMPAGNIE INDUSTRIELLE DES LASERS CILAS, Orléans (FR)

( * ) Notice: Subject to any disclaimer, the term of this patent is extended or adjusted under 35 U.S.C. 154(b) by 230 days.

(21) Appl. No.: 13/991,219

(22) PCT Filed: Nov. 29, 2011

(86) PCT No.: PCT/FR2011/052815
§ 371 (c)(1),
(2), (4) Date: Sep. 16, 2013

(87) PCT Pub. No.: WO2012/076785
PCT Pub. Date: Jun. 14, 2012

(65) Prior Publication Data
US 2013/0342896 A1 Dec. 26, 2013

(30) Foreign Application Priority Data
Dec. 6, 2010 (FR) ...................................... 10 04747

(51) Int. Cl.
*H01S 3/10* (2006.01)
*H01S 3/082* (2006.01)
(Continued)

(52) U.S. Cl.
CPC ............ *H01S 3/10023* (2013.01); *H01S 3/082* (2013.01); *H01S 3/1307* (2013.01); *H01S 3/2325* (2013.01); *H01S 3/2383* (2013.01);
(Continued)

(58) Field of Classification Search
CPC .................................................... H01S 3/10023
See application file for complete search history.

(56) References Cited

U.S. PATENT DOCUMENTS 3,393,955 A * 7/1968 Sterzer .......................... 359/247
3,414,840 A * 12/1968 Di Domenico, Jr. et al. ... 372/97
(Continued)

OTHER PUBLICATIONS

Ehlert, John C., et al. "Automated phase sensing and control of an external Talbot cavity laser with phase-constrast imaging," Applied Optics, Aug. 20, 1994, pp. 5550-5556, vol. 33, No. 24, 1994 Optical Society of America, Washington, D.C., U.S.A.
(Continued)

*Primary Examiner* — Ari M Diacou
(74) *Attorney, Agent, or Firm* — Duane Morris LLP; J. Rodman Steele, Jr.; Gregory M. Lefkowitz (57) ABSTRACT

Method and laser oscillator for the generation of a laser beam—According to the invention with a view to adjusting, inside said laser oscillator (1), the phase of each of the N elementary laser beams (FLE.1, FLE.2, FLE.N) generated on the basis of said laser oscillator (1) in such a way that said elementary laser beams are in phase, the deviation between the phase of an individual elementary laser beam (FLE.1) and the phases of the N−1 other elementary laser beams (FLE.2, FLE.N) is converted into a level of luminous intensity by means of at least one optical filtering element to which at least a part of each elementary laser beam is directed.

12 Claims, 4 Drawing Sheets

(51) Int. Cl.
*H01S 3/13* (2006.01)
*H01S 3/23* (2006.01)
*H01S 3/083* (2006.01)
*H01S 3/067* (2006.01)
*H01S 3/08* (2006.01)
*H01S 3/108* (2006.01)

(52) U.S. Cl.
CPC ............ *H01S3/06712* (2013.01); *H01S 3/083* (2013.01); *H01S 3/08054* (2013.01); *H01S 3/108* (2013.01)

(56) References Cited

U.S. PATENT DOCUMENTS

| | | | |
|---|---|---|---|
| 3,873,942 A * | 3/1975 | Reilly | 372/95 |
| 4,879,723 A * | 11/1989 | Dixon et al. | 372/21 |
| 5,046,184 A * | 9/1991 | Chee et al. | 372/18 |
| 5,138,628 A * | 8/1992 | Pocholle et al. | 372/99 |
| 5,142,542 A * | 8/1992 | Dixon | 372/22 |
| 5,164,947 A * | 11/1992 | Lukas et al. | 372/22 |
| 6,366,356 B1 | 4/2002 | Brosnan et al. | |
| 7,130,113 B2 * | 10/2006 | Shakir et al. | 359/349 |
| 7,339,727 B1 * | 3/2008 | Rothenberg et al. | 359/349 |
| 7,346,085 B1 * | 3/2008 | Rothenberg et al. | 372/29.016 |
| 2005/0169323 A1 | 8/2005 | Spariosu et al. | |
| 2006/0132903 A1 | 6/2006 | Shakir et al. | |
| 2006/0171428 A1 | 8/2006 | Volodin | |
| 2007/0201795 A1 * | 8/2007 | Rice et al. | 385/39 |
| 2008/0084598 A1 * | 4/2008 | Rothenberg et al. | 359/238 |
| 2008/0084605 A1 * | 4/2008 | Rothenberg et al. | 359/337.21 |
| 2012/0212802 A1 * | 8/2012 | Rothenberg et al. | 359/341.1 |

OTHER PUBLICATIONS

Sanders, Steve, et al., "Phase Locking of a Two-Dimensional Semiconductor Laser Array in an External Talbot Cavity," Laser Diode Technology and Applications, Jan. 1994, pp. 72-79, vol. 2148, SPIE, Los Angeles, CA, U.S.A.

Fotiadi, Andrei A., et al., "All-fiber coherent combining of Er-doped amplifiers through refractive index control in Yb-doped fibers," Optics Letters, Nov. 15, 2009, pp. 3574-3576, vol. 34, No. 22, 2009 Optical Society of America, Washington, D.C., U.S.A.

\* cited by examiner

METHOD AND LASER OSCILLATOR FOR THE GENERATION OF A LASER BEAM

CROSS-REFERENCE TO RELATED APPLICATIONS

This application is a §371 national stage entry of International Application No. PCT/FR2001/052815, filed Nov. 29, 2011, which claims priority to French Patent Application No. 1004747 filed Dec. 6, 2010, the entire contents of which are incorporated herein by reference.

BACKGROUND OF THE INVENTION

1. Field of the Invention

The present invention relates to a method and a laser oscillator for the generation of a laser beam.

Although not exclusively so, this method is particularly suitable for autonomous generation of a laser beam (that is to say without an initiation beam being injected in advance).

2. Description of the Related Art

As is known, for generating a high-power laser beam it is known initially to generate a plurality of elementary laser beams, and subsequently to aggregate the beams thus generated so hat they combine coherently at a single focus point and thus form a single laser beam, which has a higher power the higher the number of elementary beams.

However, for the power of the resulting laser beam to be optimal, it is important for the elementary laser beams all to be of the same emission frequency and the same phase.

A known solution for achieving this is disclosed for example in document U.S. Pat. No. 6,366,356. It involves initially generating a "master" laser beam from a laser oscillator, and subsequently space-division multiplexing the master beam into a plurality of elementary laser beams at the output of this oscillator. These elementary beams are amplified separately, in parallel, by the same number of optical amplifiers, and subsequently the phases thereof are adjusted. These elementary beams which are thus placed in phase are finally combined to form a single laser beam having a higher power than the master laser beam. During this combining, since all of the elementary laser beams come from the same master beam, they actually have the same emission frequency and the same power. Further, as a result of adjusting the phase of each elementary laser beam, they are also in phase.

However, this solution has the drawback of requiring two optical modules in succession: first a "master" laser oscillator and then a set of amplifiers in parallel. Finally, the device is completed by a phase analysis system for the elementary beams, a feedback loop, and a set of phase modulators located between the master oscillator and the amplifiers. It goes without saying that a device of this type proves to be particularly complex and expensive to implement, while taking up a significant amount of space.

For all of these reasons, it is desirable only to have a laser oscillator, which can itself generate the elementary laser beams autonomously for the subsequent aggregation thereof.

A known solution for achieving this is disclosed in document U.S. Pat. No. 7,130,113. Specifically, it involves arranging, within a single laser oscillator, a plurality of elementary laser cavities which can respectively generate a plurality of elementary laser beams having identical emission frequencies. For this purpose, each elementary laser cavity comprises an amplification medium which, when it is pumped or excited by introducing energy, generates an intrinsic noise in all spatial directions. The light which propagates the direction corresponding to the axis of the elementary laser cavity is amplified every successive time it passes through the amplification medium of each laser cavity, so that each elementary laser beam converges to a stationary state in which it reaches the nominal power thereof at the output of the laser oscillator. Subsequently, the elementary laser beams thus generated in the different elementary laser cavities are placed in phase in an all-optical manner, using a diaphragm which limits the emitted elementary laser beams to portions dose to the optical axis. Finally, the elementary laser beams thus placed in phase are combined so as to form a single high-power laser beam. Placing the elementary laser beams in phase is thus made simpler.

However, although this known solution is effective for combining a limited number of elementary beams (typically fewer than ten), it is not satisfactory when the number of elementary beams is larger. Specifically, as is known, the resonant frequencies (or modal coincidences) of the set of elementary laser cavities are the degrees of freedom of the laser oscillator, and make it possible to adjust the laser emission spectrum so as to maximise the effectiveness of combination. It is also important to have the largest possible number thereof, so as to combine the elementary laser beams effectively. However, when the number of elementary beams increases, these resonant frequencies are found to become scarcer, and this actually reduces the effectiveness of combination. Therefore, when it is attempted to place elementary laser beams in phase passively, and therefore by self-adjusting the emission spectrum, as is the case in document U.S. Pat. No. 7,130,113, the modal coincidences become scarcer and the effectiveness of combination is reduced.

SUMMARY OF THE INVENTION

The present invention therefore relates to a method for generating a laser beam, as well as a laser oscillator, which make it possible to generate a high-power laser beam autonomously from a large number of elementary laser beams generated from a single laser oscillator.

For this purpose, according to the invention, the method for generating a laser beam, in which:

a set of N elementary laser beams is generated from a laser oscillator, N being an integer greater than or equal to 2;

within said laser oscillator, the phase of each of the N elementary laser beams is adjusted so that said elementary laser beams are in phase; and said N elementary laser beams are subsequently aggregated so as to form the laser beam, is distinguished in that, so as to adjust the phase of each of the N elementary laser beams, the difference between the phase of an individual elementary laser beam and the phases of the other N−1 elementary laser beams is converted into a luminous intensity level by means of at least one optical filtering element to which at least part of each elementary laser beam is directed.

Thus, by virtue of the invention, it is possible to place the N elementary laser beams in phase effectively by increasing the number of degrees of freedom of the laser oscillator. Specifically, the phase adjustment of each elementary laser beam is produced within the laser oscillator itself, each successive time it passes through said oscillator. As a result, at the same time as each elementary laser beam converges to a stationary state in which it exhibits the nominal power thereof, all of the elementary laser beams converge together to an overall stationary state in which they exhibit not only the nominal powers thereof, but also phases which are perfectly adjusted with respect to one another, so that the subsequent combination thereof is made particularly effective.

Thus, whilst the prior art disclosed in document U.S. Pat. No. 7,130,113 would have encouraged the person skilled in the are to adjust the phases of the N elementary laser beams only once at the output of the laser oscillator, by way of an all-optical counter reaction (a single oscillator with N arms) for which the number of beams which can be combined effectively is limited, the invention by contrast proposes adjusting these same phases within the oscillator itself, promoting continuous, all-optical adjustment thereof as these beams are generated.

The invention also makes it possible to benefit from the advantages of the self-generating laser oscillators of the prior art, namely substantially reduced complexity and cost.

The optical filtering element may be arranged so as to apply differential attenuation to each elementary laser beam as a function of the difference between the phases of said beams.

In order for the elementary laser beams to converge to a stationary state in which they are in phase, the phase of each elementary laser beam is adjusted iteratively every successive time said elementary laser beam passes within the laser oscillator.

Preferably, during the adjustment of the phase of an individual elementary laser beam of said set of N elementary laser beams, after the difference between the phase of the individual elementary laser beam and the phases of the other N−1 elementary laser beams has been converted into a luminous intensity level:

the luminous intensity level thus obtained is converted into a phase shift, and the phase shift thus obtained is applied to said individual elementary laser beam so as to compensate said difference between the phase of said individual elementary laser beam and the phases of said other N−1 elementary laser beams.

In this way, the phases of the N elementary laser beams are self-adjusted in a purely optical manner, within the laser oscillator itself, by an iterative conversion process of "phase differences—amplitude differences" followed by "amplitude differences—phase shifts to be applied to the elementary laser beams".

A plurality of optical elements having non-linear optical properties may be arranged within the laser oscillator so as to convert, the phase shift, at least part of the luminous intensity level obtained from the difference between the phase of an individual elementary laser beam and the phases of the other N−1 elementary laser beams.

In accordance with a first embodiment, in which the path of the elementary laser beams consists of a loop within the laser oscillator, at least N light guide means are arranged between the ends of the laser oscillator, on the path of the N elementary laser beams respectively, so that said N elementary laser beams pass within the laser oscillator a number of times in succession, in a single direction along a loop.

In this case, the light guide means may be non-linear optical fibres, arranged so as to convert, in the phase shift, at least part of the luminous intensity level obtained from the difference between the phase of an individual elementary laser beam and the phases of the other N−1 elementary laser beams.

In accordance with a second embodiment, in which the path of the elementary laser beams consists of to-and-fro movements within the laser oscillator, at least two reflectors are arranged at the ends of the laser oscillator so that the N elementary laser beams pass within the laser oscillator a number of times in succession in two opposite directions, by way of multiple reflections on said reflectors.

So as to generate each elementary laser beam in parallel, a plurality of amplification media are arranged in parallel within the laser oscillator so that the N elementary laser beams are generated by crossing respectively said amplification media.

In this case, the amplification media may have non-linear gains so as to convert, in the phase shift, at least part of the luminous intensity level obtained from the difference between the phase of an individual elementary laser beam and the phases of the other N−1 elementary laser beams.

Still referring to the aforementioned case, so as to generate each elementary laser beam in parallel and autonomously, the N elementary laser beams may be generated respectively from amplification media by amplifying at least part of the intrinsic noise thereof within the laser oscillator.

Advantageously, the N elementary laser beams are aggregated at the output of the laser oscillator.

The invention further relates to a laser oscillator which can generate a set of N elementary laser beams so as subsequently to aggregate them to form a laser beam, N being an integer greater than or equal to 2, said oscillator comprising means for adjusting the phase of each elementary laser beam so that said N elementary laser beams are in phase for the subsequent aggregation thereof, distinguished in that said adjustment means comprise at least one optical filtering element, to which at least part of each elementary laser beam is directed, so as to convert the difference between the phase of an individual elementary laser beam and the phases of the other N−1 elementary laser beams into a luminous intensity level.

BRIEF DESCRIPTION OF THE DRAWINGS

The accompanying drawings will make it clear how the invention can be carried out. In these drawings, like reference numerals denote like components.

DETAILED DESCRIPTION OF THE INVENTION

Figure 1:
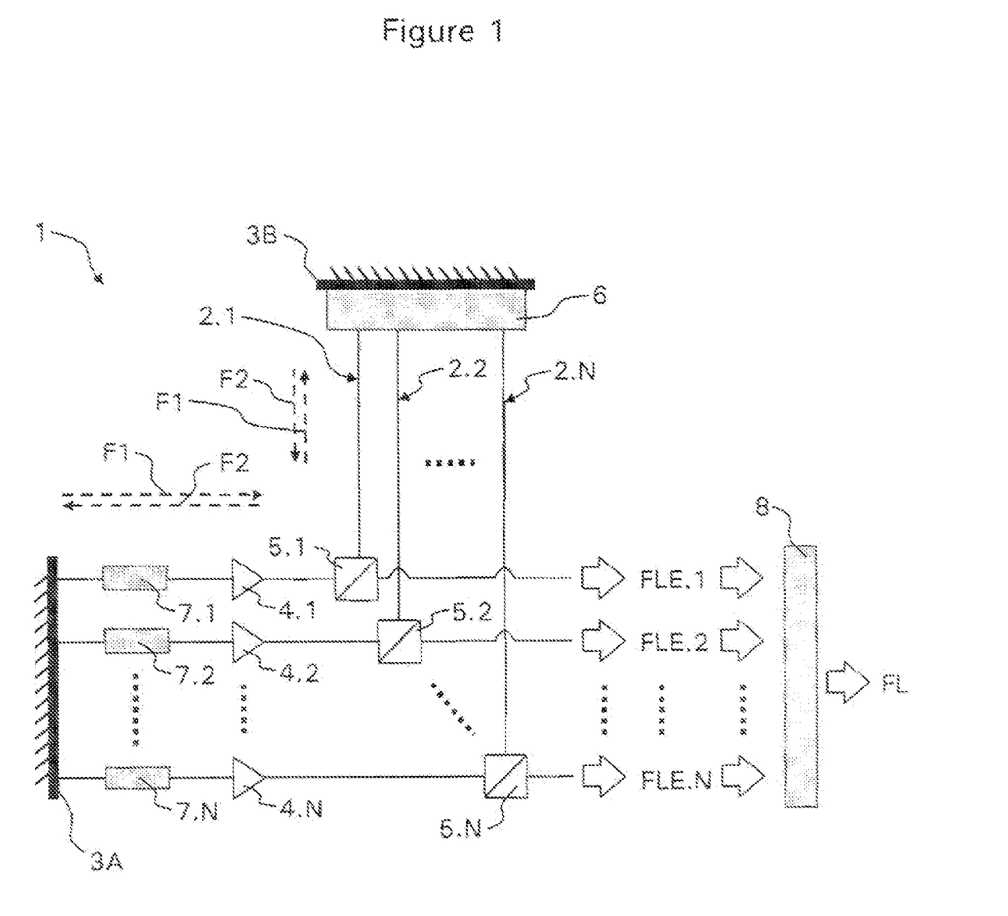
FIG. 1 shows schematically a laser oscillator in accordance with a first embodiment of the present invention.

FIG. 1 shows schematically a laser oscillator 1 according to the present invention which can generate a set of N elementary laser beams FLE.1 FLE.2, . . . FLE.N.

For this purpose, the oscillator 1 comprises a set of elementary laser cavities 2.1, 2.2, . . . , 2.N, the ends of which (which coincide with those of the oscillator 1) are respectively provided with two reflectors 3A and 3B arranged so that the elementary laser beam generated by each elementary laser cavity carries out to-and-fro movements within the laser oscillator 1 by way of multiple reflections on the reflectors 3A and 3B. These reflectors may be mirrors, for example Bragg mirrors, having a coefficient of reflection of 1. Alternatively, a plurality of pairs of elementary reflectors may be provided each pair being arranged at the ends of an elementary laser cavity.

Each elementary cavity 2.1, 2.2, . . . , 2.N comprises an amplification medium 4.1, 4.2, . . . , 4.N, which when excited emits an intrinsic noise in all spatial directions. One of these directions (represented in solid lines at the corresponding cavity 2.1, 2.2, ..., 2.N) coincides with the axis of the corresponding cavity. This axis, which is parallel to the arrows F1 and F2, is formed b the extension of the mirrors 3A and 3B and the corresponding amplification medium 4.1, 4.2, ..., 4.N. The intrinsic noise emitted in this preferred direction propagates along this axis in the direction of the arrow F1), is reflected on the mirror 3B, and subsequently propagates in the opposite direction along this axis (in the direction of the arrow F2) and passes through the corresponding amplification medium, where it is amplified. This amplified noise is reflected on the mirror 3A, and subsequently propagates along the axis of the cavity (in the direction of the arrow F1) and passes again through the amplification medium, where it is amplified further. Because of the multiple reflections on the reflectors 3A and 3B, repeating this path leads to an amplification of the intrinsic noise generated by the amplification medium, which, after several to-and-fro movements along the arrows F1 and F2, achieves a stationary state in which a laser beam FLE.1, FLE.2, .... FLE.N is generated in the cavity.

Thus, each elementary laser beam FLE.1, FLE.2, ..., FLE.N is generated within the laser oscillator 1, autonomously, from the elementary laser cavities 2.1, 2.2, ..., 2.N forming said oscillator.

These elementary laser beams FLE.1, FLE.2, ..., FLE.N are directed to an oscillator output 1, respectively via output couplers 5.1, 5.2, ..., 5.N. Each coupler, for example a polarisation extraction system (or even a separator cube), is arranged so as to reflect a first part of the corresponding elementary laser beam, coming from the amplification medium, so that this first part is directed to the reflector 3B and thus continues to propagate within the elementary laser cavity. Likewise, when the beam returns to the coupler after being reflected on the reflector 3B, it is reflected again by said coupler so as to be directed to the reflector 3A and thus to remain in the cavity. The second part of the elementary beam, however, is transmitted by the output coupler to the output of the oscillator 1. For a laser beam generated in this manner, it is possible to keep back only a small portion of the beam for the first part to be amplifies, for example 5%, whilst the remainder (95%) is transmitted at the output of the oscillator.

The laser oscillator 1 thus generates a set of N elementary laser beams FLE.1, FLE.2, ..., FLE.N which, at the output of said oscillator, are preferentially collimated and collinear. It is possible subsequently to combine these N elementary beams, for example by means of a combining element 8, which may be a lens arranged so as to converge the set of N elementary beams to a single focus point. However, if the beam FL is provided to illuminate a remote target, the combination may take place without it being necessary to provide a combining element of this type. The laser beam FL resulting from this combination thus has a higher power the higher the number N of elementary laser beams—and thus the number of corresponding elementary laser cavities.

Of the amplification media known to the person skilled in the art for generating a laser beam, it will be noted that an amplifying optical fibre is particularly suitable, since it has superior optical confinement features which help obtain a confined laser beam, which is therefore of a high spatial quality.

It will be appreciated that an elementary laser cavity is understood to mean a cavity which can generate an elementary laser beam by itself, independently of the other laser cavities. A cavity of this type may expediently be formed from an amplification medium surrounded by two reflectors. Of these elements, for the cavities to be independent, it is important for the amplification medium to be specific to each cavity, whereas the reflectors may be shared between a plurality of cavities.

So as to correct the phase errors between the elementary beams within the laser oscillator 1 according to the invention, and in order for these beams to be in phase with one another at the output of said oscillator, said oscillator comprises means for adjusting the phase of each beam.

These adjustment means comprise:
first conversion means 6 for converting the differences between the phases $\phi.1, \phi.2, \ldots, \phi.N$ of the elementary laser beams FLE.1, FLE.2, ..., FLE.N into luminous intensity levels $\Delta I.1, \Delta I.2, \ldots, \Delta I.N$; and
second conversion means 7.1, 7.2, ..., 7.N for converting the luminous intensity levels thus obtained into phase shifts $\Delta\phi.1, \Delta\phi.2, \ldots, \Delta\phi.N$.

The first conversion meals 6 are arranged between the output couplers 5.1, 5.2, ..., 5.N and the reflector 3B so that the portions of the elementary laser beams FLE.1, FLE.2, ..., FLE.N which have been drawn off by the output couplers 5.1, 5.2, ..., 5.N pass through these first conversion means 6.

Figure 3:
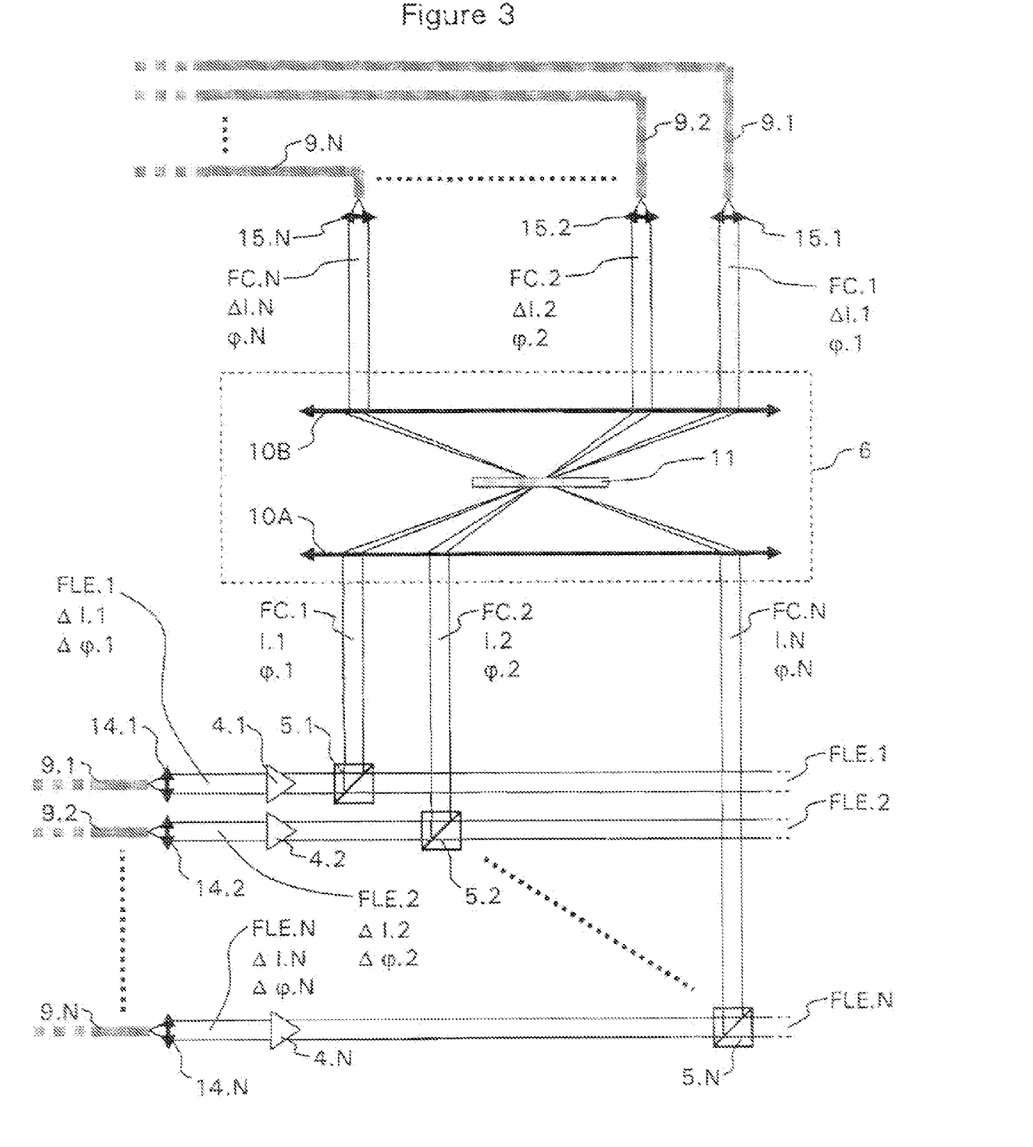
FIG. 3 is a schematic diagram, more specifically, of an example of means for converting the phase differences between the elementary laser beams into luminous intensity levels.

As shown in FIG. 3, the purpose of these first conversion means 6 is to convert the difference between the phase $\phi.1$ of a first individual elementary laser beam FLE.1 (which further has a luminous intensity level I.1) and the phases $\phi.2, \ldots, \phi.N$ of the other N−1 elementary laser beams FLE.2, ..., FLE.N (which further have luminous intensity levels I.2, ..., I.N respectively) into a luminous intensity level $\Delta I.1$, and so on for the phases of the other individual elementary laser beams.

Thus, the portion drawn off from each individual laser beam, which is sent back to an output coupler 5.1, 5.2, ..., 5.N after being reflected on the reflector 3B, carries luminous intensity information representing the phase difference between this beam and the others. In other words, this individual beam carries information on the phase shift which has to be introduced into said beam in order for it to be in phase with the other N−1 beams. These first conversion means $\beta$ thus make it possible to differentiate between the phase and amplitude information which is to be sent back to the N amplification media.

The second conversion means 7.1, 7.2, ..., 7.N are arranged between the reflector 3A and the amplification media 4.1, 4.2, ..., 4.N so that the N elementary laser beams FLE.1, FLE.2, ..., FLE.N which are to be amplified—and in particular the above-described portions of these beams which can luminous intensity level difference information pass through these means 7.1, 7.2 ..., 7.N. The purpose thereof is to transform the intensity levels I.1, I.2, ... I.N obtained at the output of the first conversion means 6 into phase shifts $\Delta\phi.1, \Delta\phi.2, \ldots, \Delta\phi.N$ respectively.

These phase shifts are applied to the corresponding elementary laser beams, the second conversion means 7.1, 7.2, ..., 7.N being arranged within the elementary cavities 2.1, 2.2, ... 2.N respectively. The phase differences between the different elementary laser beams, linked to the different optical paths in the elementary laser cavities, are thus compensated at the moment of the subsequent optical amplification in these some elementary cavities.

In this particular embodiment, the second conversion means 7.1, 7.2, ..., 7.N are formed by optical elements having non-linear properties, such as phase modulators, which are independent of the amplification media 4.1, 4.2, ..., 4.N. Alternatively, these amplification media may have non-linear gains, so that they themselves form the second conversion means. Specifically, because of the non-linearity of the gain within the amplifiers 4.1, 4.2, ..., 4.N, the differential gains between these amplifiers, into which signals are injected of which the amplitudes are generally different (for example linked to the first conversion means 6), themselves bring about a differential phase shift, in a further alternative, the second conversion means may be formed by a combination of the aforementioned elements.

Thus, the adjustment means 6 and 7.1, 7.2, ..., 7.N, which are optical in nature, make it possible to adjust the phases of the elementary laser beams so that they can be combined coherently at the output of the oscillator 1, so as to obtain a laser beam FL having a correspondingly higher light density.

In the example of FIG. 1, the laser oscillator 1 according to the invention is of a linear configuration. An annular configuration is shown schematically in FIG. 2.

Figure 2:
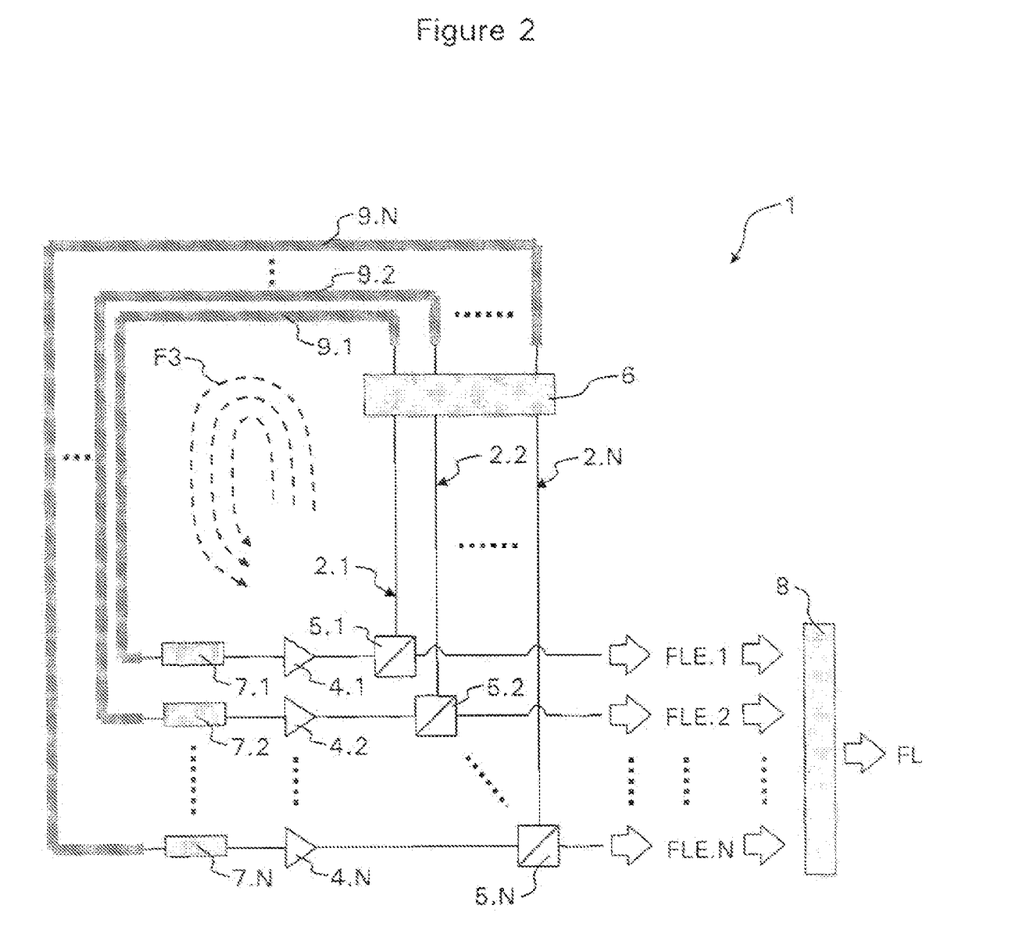
FIG. 2 shows schematically a laser oscillator in accordance with a second embodiment of the present invention.

It differs from the linear configuration of FIG. 1 in that the reflectors 3A and 3B are replaced by N light guide means 9.1, 9.2, ..., 9.N, each light guide means being associated with one of the N elementary laser cavities 2.1, 2.2, ..., 2.N. Each guide means is arranged so that the portion drawn off from each elementary beam is injected into this guide means and propagates therein to be directed to the second conversion means 7.1, 7.2, ..., 7.N of the corresponding elementary laser cavity.

These guide means 9.1, 9.2, ..., 9.N thus make it possible to join the ends of each elementary laser cavity, where the reflectors 3A and 3B are arranged in the configuration of FIG. 1, so that the elementary laser beams FLE.1, FLE.2, ..., FLE.N propagate in the elementary laser cavities 2.1, 2.2, ..., 2.N respectively in a single direction, represented by the arrow F3, so that the path of these beams forms a loop in which the beam is amplified by the amplification media 4.1, 4.2, ..., 4.N respectively.

In this way, the first conversion means 6 are linked directly to the second conversion means 7.1, 7.2, ..., 7.N, in the direction of the path of the beams FLE.1, FLE.2, ..., FLE.N, and the phases $\phi.1, \phi.2, ..., \phi.N$ of the elementary laser beams are thus well adjusted to each loop which is passed through in the oscillator so as to converge to a stationary state in which all of the beams FLE.1, FLE.2, ..., FLE.N are in phase and can therefore be combined coherently so as to maximise the light density resulting from this combining.

In accordance with a further embodiment of the invention, the light guide means 9.1, 9.2, ..., 9.N are on-linear optical fibres, so that they can form the second conversion means, at least in part. Alternatively, the second conversion means may comprise a combination of non-linear optical fibres of this type, independent elements having non-linear optical properties, and amplification media having non-linear gains, or even a combination of only two thereof.

In the following, a purely optical embodiment of the first conversion means 6, suitable for an annular configuration (FIG. 2), is disclosed with reference to FIGS. 3 and 4. These means 6, which convert phase differences into luminous intensity levels, comprise a pair of lenses 10A and 10B arranged so that the image focal plane of the lens 10A coincides with the object focal plane of the lens 10B, so as to form an afocal optical system, as well as an optical filter 11 arranged in the image and object focal planes of the lenses 10A and 10B respectively, so that it is centred on the axis of the afocal optical system thus formed.

Figure 4:
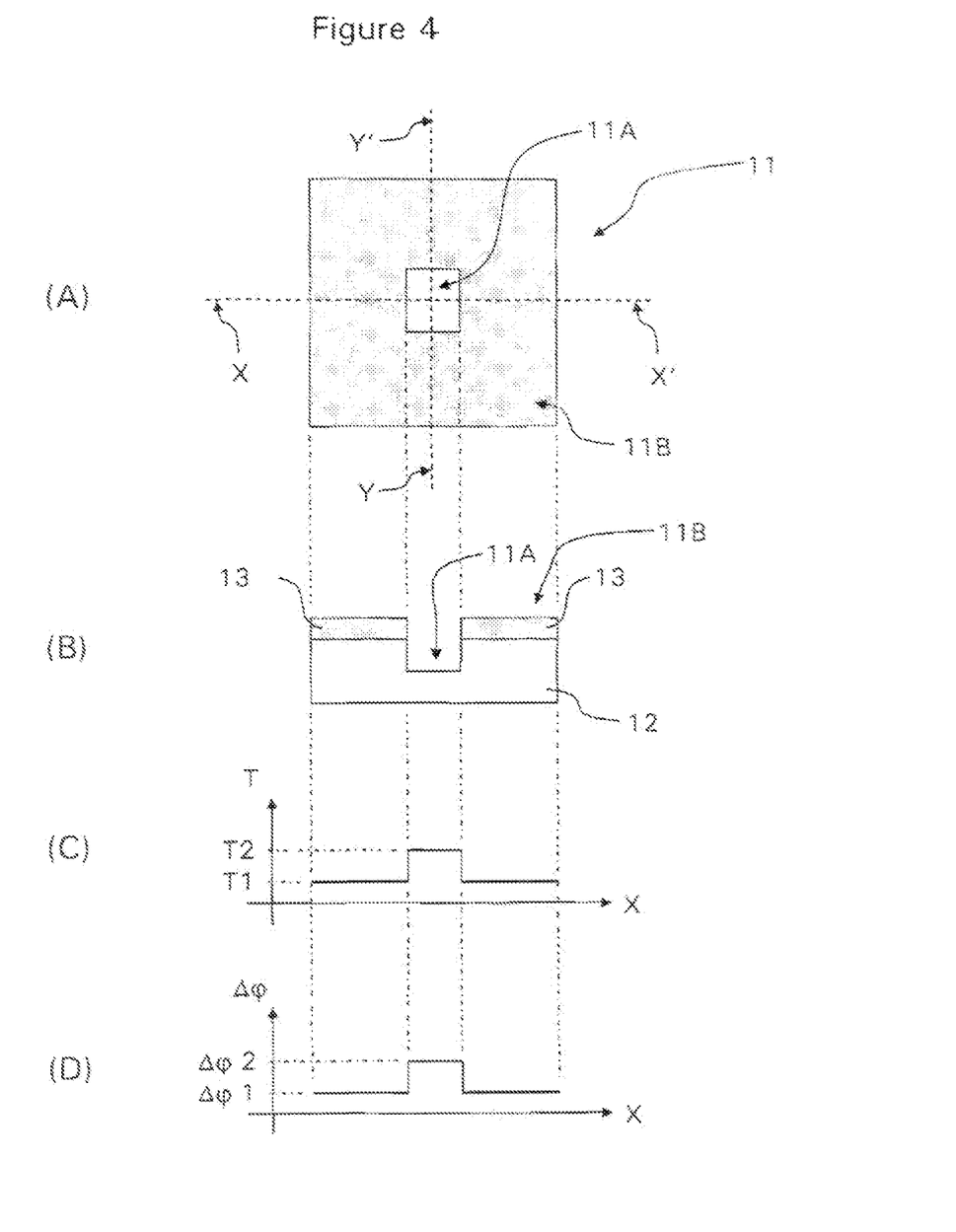
FIG. 4 includes schematic diagrams A, B, C and D showing an example of an optical filtering element incorporated in the optical adjustment means of FIG. 3.

When arranged in this way, the first conversion means 6 make it possible to direct the portions FC.1, FC.2, ..., FC.N drawn off from the elementary laser beams FLE.1, FLE.2, ..., FLE.N respectively into a single zone of the optical filter 11, the structure of which is shown in greater detail in a plan view in schematic diagram 1 of FIG. 4. This spatial optical filter 11 operates by phase contrast, known more particularly in the field of phase contrast microscopy.

This filter 11 has for example two zones, a central zone 11A and a peripheral zone 11B, having different optical properties in terms of phase and attenuation, so as to apply a differential attenuation to each of the N laser beams which pass through it, as a function of the phase shift between the filter 11 and the relevant laser beam, in the plane of the filter 11.

For this purpose, as shown in a sectional view in schematic drawing B of FIG. 4, the optical filter 11 comprises:
- a lower phase shift layer 12, which extends so as to cover the central and peripheral zones 11A and 11B, and which has an additional depression in said central zone 11A, and
- an upper amplitude attenuation layer 13, which extends so as to coincide with the peripheral zone 11B.

The lower layer 12, which carries out the desired phase shift, may be formed of a glass slide of high optical quality, engraved in the central part thereof. However, the upper layer 13, which is involved in the partial amplitude attenuation of each elementary laser beam (only the peripheral part of said beam), may be formed of an appropriate deposition of dielectric layers.

In accordance with a further embodiment of the filter 11, it is formed of a single layer, the shape and extent of which are analogous to those of the lower layer 12 and the optical properties of which are appropriate for simultaneously attenuating and phase-shifting each elementary beam. For example, a suitable dielectric treatment may carried out for this purpose.

The optical filter 11 thus makes it possible:
- as shown in schematic drawing C of FIG. 4 (which shows en example of the profile of the transparency level of the filter 11 over the longitudinal extent thereof), to attenuate the amplitude of the peripheral part (transmittance T1) with respect to that of the central part (transmittance T2, greater than T1) of each elementary laser beam, and
- as shown in schematic drawing D of FIG. 4 (which shows an example of the profile of the level of phase shift of the filter 11 over the longitudinal extent thereof), to introduce a phase shift between the peripheral part (phase shift $\Delta\phi 1$) and the central part (phase shift $\Delta\phi 2$, greater than $\Delta\phi 1$) of each elementary laser beam.

Subsequently, these elementary beams FC.1, FC.2, ... FC.N, the phase and amplitude of which have already been altered spatially, are directed to the second conversion means 7.1, 7.2, ..., 7.N.

The first conversion means 6 have been shown in FIGS. 3 and 4 for integration into a laser oscillator according to the present invention, in an annular configuration (FIG. 2). If it is desired to integrate these means 6 into a laser oscillator having a linear configuration (FIG. 1), the person skilled in the art will note that it is sufficient to adapt the structure of the means 6, taking into account the fact that each elementary beam crosses the means 6 twice in this case because of the reflection on the reflector 3B. Thus, in this type of configuration, the afocal optical system or the means 6 can be formed from a single lens 10A, the image focal plane of which coincides with the plane of the reflector 3B, and an optical filter 11 corresponding to that of schematic diagrams A and B of FIG. 4, arranged against the reflector 3B and having the thicknesses of the various parts divided by two. In this configuration, these means 6 are thus formed so as to re-form the means 6 of FIG. 3 by reflection on the reflector 3B.

As stated above, the second conversion means, which have the purpose of converting luminous intensity levels into phase shifts, can be formed by the amplification media 4.1, 4.2, ..., 4.N, by the light guide means 9.1, 9.2, ..., 9.N and/or by independent elements having non-linear optical properties.

However, additional components may equally be used to carry out this intensity/phase conversion, instead of or in addition to the aforementioned elements. More particularly, these components may have optical properties such that they are sensitive to the incident luminous intensity, for example through Kerr non-lineanties or through thermo-optical effects.

It will be noted that, if the amplification media 4.1, 4.2, . . . , 4.N are formed by amplifying optical fibres, it is important to arrange collimation means 14.1, 14.2, 14.N for the elementary laser beams FLE.1, FLE.2, FLE.N at the output of these fibres, for example in the form of collimating lenses having object focal planes positioned substantially at the ends of the fibres. Likewise, so as to inject the drawn-off beams FC.1, FC.2, . . . , FC.N into the light guide means 9.1, 9.2, . . . , 9.N in an optimal manner, it is advantageous to arrange injection means 15.1, 15.2, . . . , 15.N for said drawn-off beams upstream from said guide means, for example in the form of convergent lenses having image focal planes positioned substantially at the ends of the guide means.

The invention claimed is:

1. Method for generating a laser beam (FL), comprising:
a set of N elementary laser beams (FLE.1, FLE.2, . . . , FLE.N) is generated from a laser oscillator (1), N being an integer greater than or equal to 2;
within said laser oscillator, the phase ($\phi.1, \phi.2, \ldots, \phi.N$) of each of the N elementary laser beams is adjusted so that said elementary laser beams are in phase; and
said N elementary laser beams are subsequently aggregated so as to form the laser beam (FL),
wherein, so as to adjust the phase of each of the N elementary laser beams, the difference between the phase ($\phi.1$) of an individual elementary laser beam (FLE.1) and the phases ($\phi.2, \ldots, \phi.N$) of the other N−1 elementary laser beams (FLE.2, . . . , FLE.N) is converted into a luminous intensity level ($\Delta I.1$), by means of at least one optical filtering by phase contrast element (11) through which at least part (FC.1, FC.2, . . . , FC.N) of each elementary laser beam is directed,
wherein the luminous intensity level ($\Delta I.1$) thus obtained is converted into a phase shift ($\Delta\phi.1$), and
the phase shift ($\Delta\phi.1$) thus obtained is applied to said individual elementary laser beam (FLE.1) so as to compensate said difference between the phase ($\phi.1$) of said individual elementary laser beam (FLE.1) and the phases ($\phi.2, \ldots, \phi.N$) of said other N−1 elementary laser beams (FLE.2, . . . , FLE.N).

2. Method according to claim 1, wherein the optical filtering element (11) is arranged so as to apply differential attenuation ($\Delta I.1, \Delta I.2, \ldots, \Delta I.N$) to each elementary laser beam (FLE.1, FLE.2, . . . , FLE.N) as a function of the difference between the phases ($\phi.1, \phi.2, \ldots, \phi.N$) of said beams.

3. Method according to claim 1, wherein the phase ($\phi.1, \phi.2, \ldots, \phi.N$) of each elementary laser beam (FLE.1, FLE.2, . . . , FLE.N) is adjusted iteratively every successive time said elementary laser beam passes within the laser oscillator (1).

4. Method according to claim 3, wherein, during the adjustment of the phase ($\phi.1$) of an individual elementary laser beam (FLE.1) of said set of N elementary laser beams (FLE.1, FLE.2, . . . , FLE.N), after the difference between the phase ($\phi.1$) of the individual elementary laser beam (FLE.1) and the phases ($\phi.2, \ldots, \phi.N$) of the other N−1 elementary laser beams (FLE.2, . . . , FLE.N) has been converted into a luminous intensity level ($\Delta I.1$).

5. Method according to claim 4, wherein a plurality of optical elements (7.1, 7.2, . . . , 7.N) having non-linear properties are arranged within the laser oscillator (1) so as to convert, in the phase shift ($\Delta\phi.1$), at least part of the luminous intensity level ($\Delta I.1$) obtained from the difference between the phase ($\phi.1$) of an individual elementary laser beam (FLE.1) and the phases ($\phi.2, \ldots, \phi.N$) of the other N−1 elementary laser beams (FLE.2, . . . , FLE.N).

6. Method according to claim 1, wherein at least N light guide means (9.1, 9.2, . . . , 9.N) are arranged between the ends of the laser oscillator (1), on the path of the N elementary laser beams (FLE.1, FLE.2, . . . , FLE.N) respectively, so that said N elementary laser beams pass within the laser oscillator (1) a number of times in succession, in a single direction (F3) along a loop.

7. Method according to claim 6, wherein the light guide means (9.1, 9.2, . . . , 9.N) are non-linear optical fibres, arranged so as to convert, in the phase shift ($\Delta\phi.1$), at least part of the luminous intensity level (I.1) obtained from the difference ($\Delta\phi.1$) between the phase ($\phi.1$) of an individual elementary laser beam (FLE.1) and the phases ($\phi.2, \ldots, \phi.N$) of the other N−1 elementary laser beams (FLE.2, . . . , FLE.N).

8. Method according to claim 1, wherein at least two reflectors (3A, 3B) are arranged at the ends of the laser oscillator (1) so that the N elementary laser beams (FLE.1, FLE.2, . . . , FLE.N) pass within the laser oscillator (1) a number of times in succession in two opposite directions (F1, F2), by multiple reflections on said reflectors.

9. Method according to claim 1, wherein a plurality of amplification media (3.1, 3.2, . . . , 3.N) are arranged in parallel within the laser oscillator (1) so that the N elementary laser beams (FLE.1, FLE.2, . . . , FLE.N) are generated by crossing respectively said amplification media.

10. Method according to claim 9, wherein the amplification media (4.1, 4.2, . . . , 4.N) have non-linear gains so as to convert, in the phase shift ($\Delta\phi.1$), at least part of the luminous intensity level ($\Delta I.1$) obtained from the difference ($\Delta\phi.1$) between the phase ($\phi.1$) of an individual elementary laser beam (FLE.1) and the phases ($\phi.2, \ldots, \phi.N$) of the other N−1 elementary laser beams (FLE.2, . . . , FLE.N).

11. Method according to claim 9, wherein the N elementary laser beams (FLE.1, FLE.2, . . . , FLE.N) are generated respectively from amplification media (4.1, 4.2, . . . , 4.N) by amplifying at least part of the intrinsic noise thereof within the laser oscillator (1).

12. Laser oscillator (1) which can generate a set of N elementary laser beams (FLE.1, FLE.2, . . . , FLE.N) so as subsequently to aggregate them to form a laser beam (FL), N being an integer greater than or equal to 2, said oscillator (1) comprising means (6, 4.1, 4.2, . . . , 4.N, 7.1, 7.2, . . . , 7.N; 6, 4.1, 4.2, . . . , 4.N, 9.1, 9.2, . . . , 9.N) for adjusting the phase of each elementary laser beam so that said N elementary laser beams are in phase for the subsequent aggregation thereof, characterised in that said adjustment means comprise at least one optical filtering by phase contrast element (11), through to which at least part (FC.1, FC.2, . . . , FC.N) of each elementary laser beam is directed, so as to convert the difference between the phase ($\phi.1$) of an individual elementary laser beam (FLE.1) and the phases ($\phi.2, \ldots, \phi.N$) of the other N−1 elementary laser beams (FLE.2, . . . , FLE.N) into a luminous intensity level ($\Delta I.1$);
means (7.1, . . . , 7.N) for converting the luminous intensity level ($\Delta 1.1$) thus obtained into a phase shift ($\Delta\phi.1$); and
means for applying to said elementary laser beam (FLE.1) the phase shift (4.1) thus obtained, so as to compensate said difference between the phase ($\phi.1$) of said individual elementary laser beam (FLE.1) and the phases ($\phi.2, \ldots, \phi.N$) of said other N−1 elementary laser beams (FLE.2, . . . , FLE.N).

* * * * *